United States Patent
Asano et al.

(10) Patent No.: US 7,282,528 B2
(45) Date of Patent: Oct. 16, 2007

(54) ELECTRODE ADDITIVE

(75) Inventors: Michio Asano, Settsu (JP); Kenji Ichikawa, Settsu (JP); Takatomo Nishino, Koriyama (JP); Tadashi Ino, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 570 days.

(21) Appl. No.: 10/240,500

(22) PCT Filed: Apr. 6, 2001

(86) PCT No.: PCT/JP01/02979

§ 371 (c)(1),
(2), (4) Date: Oct. 3, 2002

(87) PCT Pub. No.: WO01/78171

PCT Pub. Date: Oct. 18, 2001

(65) Prior Publication Data

US 2003/0158310 A1    Aug. 21, 2003

(30) Foreign Application Priority Data

Apr. 7, 2000   (JP) .............................. 2000-106962

(51) Int. Cl.
*C08K 5/06* (2006.01)
*C08F 14/18* (2006.01)
*H01M 4/04* (2006.01)
*H01M 4/62* (2006.01)

(52) U.S. Cl. .................. 524/291; 524/366; 524/505; 524/521; 524/544; 524/546

(58) Field of Classification Search ............... 524/366, 524/429, 505, 520, 521, 544, 546, 29, 54, 524/291

See application file for complete search history.

(56) References Cited

U.S. PATENT DOCUMENTS 3,009,892 A    11/1961  Duddington et al.
6,498,207 B1 *  12/2002  Hoshikawa et al. ........ 524/378

FOREIGN PATENT DOCUMENTS

| EP | 0 386 305 | 9/1990 |
| JP | 45-39829 | 12/1970 |
| JP | 55-93671 | 7/1980 |
| JP | 57-143262 | 9/1982 |
| JP | 2-158055 | 6/1990 |
| JP | 2-291665 | 12/1990 |
| JP | 6-280079 | 10/1994 |
| JP | 7-153467 | 6/1995 |
| WO | 099 43750 | * 9/1999 |

* cited by examiner

*Primary Examiner*—Kriellion A Sanders
(74) *Attorney, Agent, or Firm*—B. Aaron Schulman; Stites & Harbison

(57) ABSTRACT

An electrode additive comprising an aqueous fluoropolymer dispersion, wherein the aqueous fluoropolymer dispersion is stabilized by the use of a surfactant that does not substantially remain in an electrode coating film after a drying step during electrode production.

18 Claims, No Drawings

ELECTRODE ADDITIVE

TECHNICAL FIELD

This invention relates to an electrode additive used in the production of an electrode for a cell or capacitor. This electrode additive can be used as a binder or a water repellant. The present invention also relates to an aqueous dispersion composition containing a fluoropolymer. The present invention further relates to a method for manufacturing an electrode.

BACKGROUND ART

An aqueous fluoropolymer dispersion synthesized by emulsion polymerization (hereinafter also referred to as a fluoropolymer dispersion) is generally unstable and, when subjected to a mechanical shearing force or the like, produces a coagulation that cannot be redispersed. Accordingly, such dispersions are stored and sold in a concentrated and stabilized form obtained by adding a polyoxyalkyl ether or other such nonionic surfactant, an example of which is Triton X-100 (trademark; hereinafter also referred to as TX-100) made by Union Carbide. An aqueous fluoropolymer dispersion has a higher specific gravity than an aqueous hydrocarbon dispersion. For instance, an aqueous dispersion of polytetrafluoroethylene has a tendency of fibrillate, and requires a relatively large quantity of surfactant (5 to 20 wt %). Applications of such fluoropolymer dispersions include various coating agents, electrode binders, and electrode water repellents, as described in Japanese Unexamined Patent Publications S45-39829, H2-158055, and H2-291665, and elsewhere.

However, when a fluoropolymer dispersion containing a nonionic surfactant such as Triton X-100 is used as an electrode binder, which is an application obtained by way of coating and drying steps, the surfactant remains in the electrode coating film, and it is undesirable for the surfactant to remain in a cell system because the residual surfactant will lead to an increase in internal resistance, deterioration of cycle characteristics, and so forth.

On the other hand, in terms of the stability of a fluoropolymer dispersion, the addition of a surfactant is indispensable, so it can be said that it is the most desirable to use a surfactant that can be completely removed from the inside of the coating film by pyrolysis, evaporation, volatilization, or the like, in an electrode coating film drying step during electrode production.

However, up to now, the aspects of compatibility with the fluoropolymer, adhesion, foaming resistance, stability against a shearing force, and so forth, have been emphasized in the selection of a surfactant, and there was no fluoropolymer dispersion that made use of a surfactant as described above.

It is an object of the present invention to provide an electrode additive suitable for the production of an electrode with no or substantially no residual substance originating in a surfactant.

It is also an object of the present invention to provide a stable aqueous dispersion composition containing a fluoropolymer.

It is a further object of the present invention to provide a method for manufacturing an electrode with no or substantially no residual substance originating from a surfactant.

DISCLOSURE OF THE INVENTION

The inventors carried out investigations into various surfactants that could stabilize a fluoropolymer dispersion in order to prevent decomposed matter originating from a surfactant from remaining in an electrode, and as a result found that a particular surfactant has an outstanding effect under a wide range of drying conditions. Further investigation led to the present invention.

The present invention provides the following 1 to 12.

1. An electrode additive comprising an aqueous fluoropolymer dispersion, wherein the aqueous fluoropolymer dispersion is stabilized by the use of a surfactant that does not substantially remain in an electrode coating film after a drying step during electrode production.

2. The electrode additive according to 1 above, wherein the surfactant is a nonionic surfactant expressed by General Formula 1:

$$R1-O-(CH_2CH_2O)_q-(A1)_p-(CH_2CH_2O)_r-R2 \quad (1)$$

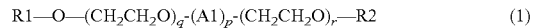

(wherein A1 is $-CH(CH_3)CH_2O-$ or $-CH(CH_3)-CH_2CH_2O-$,

R1 and R2 are each a hydrogen atom, a $C_1$ to $C_7$ alkyl group, or a $C_3$ to $C_7$ alkenyl group, p is an integer from 0 to 400, q is an integer from 1 to 400, r is an integer from 0 to 400, $5 \leq p+q+r \leq 1000$, $1 \leq (q+r)/p \leq 800$ (when p is not 0), when p=0, r=0, and when $1 \leq p \leq 400$, $0 \leq r \leq 400$).

3. The electrode additive according to 1 above, wherein the surfactant is an anionic surfactant containing perfluoroalkyl groups or perchlorofluoroalkyl groups.

4. The electrode additive according to 1 above, wherein the surfactant is an amphoteric surfactant comprising amine oxides.

5. The electrode additive according to 1 above, wherein the surfactant is used in an amount of 2 to 25 wt % with respect to polymer solids.

6. The electrode additive according to any of 1 to 6 above, wherein the fluoropolymer is a blend of at least two types of fluoropolymers.

7. The electrode additive according to 1 above, wherein the electrode is a cell electrode or a capacitor electrode.

8. The electrode additive according to 1 above, used as a binder or a water repellant.

9. An electrode containing the electrode additive according to any of 1 to 8 above.

10. A method for manufacturing an electrode by making a paste from an electrode constituent material comprising a mixture of an electrode active material, an electroconductive agent, and a binder, and coating a collector with the paste, wherein the collector is coated with the electrode constituent material paste obtained by dispersing the electrode constituent material in a dispersant composed of an aqueous solution of 0.5 to 30 wt % of the surfactant according to 2 above.

11. An aqueous dispersion composition containing a fluoropolymer and a nonionic surfactant expressed by General Formula 1:

$$R1-O-(CH_2CH_2)-q-(A1)_p-(CH_2CH_2O)_r-R2 \quad (1)$$

(wherein A1 is $-CH(CH_3O)CH_2O-$ or $-CH(CH_3)-CH_2CH_2O-$,

R1 and R2 are each a hydrogen atom, a $C_1$ to $C_7$ alkyl group, or a $C_3$ to $C_7$ alkenyl group, p is an integer from 0 to 400, q is an integer from 1 to 400, r is an integer from 0 to 400, $5 \leq p+q+r \leq 1000$, $1 \leq (q+r)/p \leq 800$ (when p is not 0), when p=0, r=0, and when $1 \leq p \leq 400$, $0 \leq r \leq 400$).

12. The composition according to 10 above, wherein the nonionic surfactant is a polyoxyethylene polyoxypropylene block polymer.

Examples of fluoropolymers that can be used in the present invention include polytetrafluoroethylene (PTFE), tetrafluoroethylene/hexafluoropropylene copolymer (FEP), polyvinylidene fluoride (PVdF), ethylene/tetrafluoroethylene copolymer (ETFE), tetrafluoroethylene/perfluoroalkyl vinyl ether copolymer (PFA), vinylidene fluoride/hexafluoropropylene copolymer (P(VdF-HFP)), vinylidene fluoride/tetrafluoroethylene copolymer (P(VdF-TFE)), vinylidene fluoride/tetrafluoroethylene/perfluoromethyl vinyl ether copolymer (P(VdF-TFE-PMVE)), vinylidene fluoride/tetrafluoroethylene/chlorotrifluoroethylene copolymer (P(VdF-TFE-CTFE)), vinylidene fluoride/tetrafluoroethylene/hexafluoropropylene copolymer (P(VdF-TFE-HFP)), vinylidene fluoride/tetrafluoroethylene/perfluoropropyl vinyl ether copolymer (P(VdF-TFE-PPVE)), vinylidene fluoride/tetrafluoroethylene/hexafluoropropylene copolymer elastomer (P(VdF-TFE-HFP) elastomer), polyvinylidene fluoride or ethylene/tetrafluoroethylene copolymer, and a segmented polymer in which the hard segment is polytetrafluoroethylene and the soft segment is a vinylidene fluoride/tetrafluoroethylene/hexafluoropropylene copolymer elastomer, a vinylidene fluoride/hexafluoropropylene copolymer elastomer, or a tetrafluoroethylene/perfluoromethyl vinyl ether copolymer elastomer.

The polytetrafluoroethylene referred to here includes not only a tetrafluoroethylene homopolymer, but also a modified polytetrafluoroethylene obtained by copolymerizing with a small amount of one or more other comonomers to the extent that melt fluidity is not imparted. Examples of comonomers include hexafluoropropylene, chlorotrifluoroethylene, perfluoro(alkyl vinyl ether), perfluoro(alkoxyvinyl ether), trifluoroethylene, and perfluoroalkylethylene. The proportion of a comonomer in copolymerization will vary with the type thereof, and, for example, when a perfluoro(alkyl vinyl ether) or perfluro(alkoxyvinyl ether) is used as the comonomer, it is usually preferable to use it in an amount of no more than 2 wt %, and more preferably 0.01 to 1 wt %. Similarly, besides polytetrafluoroethylene, other fluoropolymers can be modified using a small amount of one or more other comonomers.

The aqueous fluoropolymer dispersion (fluoropolymer dispersion) of the present invention can be manufactured by a conventional method such as emulsion polymerization.

Next, the surfactant of the present invention will be described. The amount of surfactant remaining in an electrode coating film is determined in terms of the results derived from the weight reduction that occurs when a specific amount of a fluoropolymer dispersion to which a surfactant has been added in an amount of 10 wt % with respect to the fluoropolymer solids is placed in a petri dish and dried for 60 minutes at 180° C. with a hot air dryer.

The phrase "a surfactant that does not substantially remain in an electrode coating film" as used in the present invention refers to a case in which the total amount of surfactant and decomposed matter originating in surfactant is at most 6 wt %, and preferably no more than 4 wt %, and even more preferably no more than 2 wt %, with respect to the fluoropolymer solids.

Furthermore, this surfactant is capable of stabilizing the fluoropolymer dispersion well enough that it can be stored as a cell or capacitor electrode additive comprising this dispersion.

Examples of these surfactants include the following nonionic surfactants, anionic surfactants, and amphoteric surfactants. These surfactants may be used singly or in combinations of two or more types.

Nonionic Surfactants

Examples include surfactants expressed by the following Formula 1.

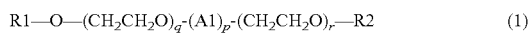

R1—O—(CH$_2$CH$_2$O)$_q$-(A1)$_p$-(CH$_2$CH$_2$O)$_r$—R2 (1)

(Wherein R1, R2, A1, p, q, and r are defined as above.)

R1 and R2 are each a preferably hydrogen atom, a C$_1$ to C$_7$ alkyl group, or a more preferably C$_1$ to C$_3$ alkenyl group. Examples of C$_1$ to C$_7$ alkyl groups include a methyl group, an ethyl group, a n-propyl group, an isopropyl group, a n-butyl group, an isobutyl group, a tert-butyl group, a pentyl group, a hexyl group, and other such linear or branched C$_1$ to C$_7$ alkyl groups.

Examples of a C$_3$ to C$_7$ alkenyl group (allyl group) include a 2-propenyl group, a butenyl group, a pentenyl group, a hexenyl group, and a heptenyl group.

A1 is preferably —CH(CH$_3$)CH$_2$O—.

p is preferably an integer from 0 to 80, with an integer of 0 to 40 being even better.

q is preferably an integer from 1 to 200, with an integer of 1 to 100 being even better.

r is preferably an integer from 0 to 200, with an integer of 0 to 100 being even better.

Specific examples of nonionic surfactants include polyoxyethylene polyoxypropylene block polymers such as Plonon 102, Plonon 104, Plonon 108, Plonon 204, Plonon 208, and so forth, made by Nippon Oil & Fats.

Anionic Surfactants

Examples of anionic surfactants include a fluorosulfonic acid-based and fluorocarboxylic acid-based surfactant having a fluoroalkyl group, and particularly a perfluoroalkyl group or a chlorofluoroalkyl group, and particularly a perchlorofluoroalkyl group.

Typical compounds include those expressed by the following Formulas 2 and 3.

X—(CF$_2$CF$_2$)$_n$(CH$_2$)$_m$-A (2), and

X—(CF$_2$CFCl)$_n$(CH$_2$)$_m$-A (3)

(wherein X is a hydrogen atom, a fluorine atom, or a chlorine atom, n is an integer from 3 to 10, m is 0 or an integer from 1 to 4, A is a carboxyl group, a sulfonic acid group, or an alkali metal (sodium, potassium, lithium, or cesium) salt or an ammonium salt thereof.) Examples of commercially available products include Unidyne DS101, which is an aqueous solution of ammonium perfluorooctanoate made by Daikin Industries.

Amphoteric Surfactants Composed of Amine Oxides

Examples of surfactants composed of amine oxides include dihydroxyethylalkylamine oxides, dimethylalkylamine oxides, and dimethylalkylethoxyamine oxides. Examples of commercially available products include dihydroxyethyllaurylamine oxide (Unisafe A-LE), dimethyllaurylamine oxide (Unisafe A-LM), and dimethyllaurylethoxyamine oxide (Unisafe A-LY) made by Nippon Oil & Fats.

The surfactant can be used in an amount that will allow the fluoropolymer dispersion to be stabilized, and while this amount will vary with the types of fluoropolymer and surfactant, the concentration of fluoropolymer, and so forth, it is usually about 2 to 25 wt %, and preferably about 3 to 20 wt %, and even more preferably about 3 to 15 wt %, with respect to the polymer solids.

The "surfactant that does not substantially remain" used in the present invention can be removed simultaneously with the solvent in the solvent (water in particular) removal step, by heating and drying for between 10 minutes and 1 hour at about 100 to 250° C. after the formation of the coating film.

The surfactant of the present invention may also be used together with a surfactant used in the past (that is, a surfactant that does remain, but exhibits high performance in stabilizing fluoropolymer dispersions). Examples of surfactants that can be used concurrently include, but are not limited to, higher alcohol sulfates (such as sodium laurylsulfate); nonionic surfactants including polyoxyethylene alkyl ethers, such as polyoxyethylene alkyl phenyl ether (Triton X-100 made by Union Carbide), polyoxyethylene isotridecyl ether (Dispanol TOC made by Nippon Oil & Fats), polyoxyethylene oxypropylene tridecyl ether, and polyoxyethylenoxypropylene tridecyl ether; polyoxyethylene fatty acid esters; sorbitan fatty acid esters; and glycerol esters. When surfactants are used together, the amount of the surfactant of the present invention can be at least 10 wt %, with at least 30 wt % being preferable, at least 50 wt % being even more preferable, at least 70 wt % being better yet, and at least 90 wt % being particularly good.

The present invention is useful as an electrode binder used in the production of a cell or capacitor electrode, but is also useful as an electrode water repellant. It is also not limited to applications for electrodes, and can be used, for example, in paints used to impregnate glass cloth or in water-based paints and coating agents in which fluoropolymer dispersions are generally used.

When the electrode additive of the present invention is used as a binder for a cell electrode, the standard practice is to use an aqueous solution of an electrode active material, a electroconductive agent, the cell electrode binder of the present invention, and a cellulose-based thickener, such as carboxymethyl cellulose or methyl cellulose, as the electrode constituent material paste to be applied. Similarly, when the present invention is used as a capacitor electrode binder, it can be produced by making a paste from carbon and the cell electrode binder of the present invention using a cellulose-based thickener, then applying and drying the coating.

Examples of the "electrode constituent material" referred to here include an electrode (positive or negative electrode) active material, such as an oxide or hydroxide of cobalt, nickel, manganese, lithium, or the like, or a hydrogen occluding alloy, and a electroconductive agent, such as carbon (graphite, acetylene black and so forth). An example of an electrode constituent material for a capacitor is carbon (such as activated carbon or acetylene black).

The surfactant described in claim 2 of the present invention can also be used as an alternative to a cellulose-based thickener. In this case, the surfactant described in claim 2 is dissolved to produce an aqueous solution in which the surfactant is 0.5 to 30 wt %, and in which is dispersed an electrode constituent material composed of a mixture of an electrode active material, a electroconductive agent, a binder, and so forth, to create an electrode constituent material paste, which is used to coat a collector. It is more common here to mix the paste in two stages, in which the conductive agent and the electrode active material (excluding the binder) are first mixed into the surfactant aqueous solution described in claim 2, and the binder is then added and mixed.

The concentrations of the premixed aqueous surfactant solutions mentioned above vary, for the reason that the molecular weights of the surfactants vary, and the viscosities can be adjusted by mixing in other thickeners. The advantage in using the surfactant described in claim 2 as a dispersant is that decomposition residue can be kept to a minimum after electrode production because this surfactant is so easily pyrolyzed. It is also possible to use a mixture of a conventional cellulose-based thickener for the purpose of adjusting viscosity.

When the aqueous surfactant solution described in claim 2 is used as a dispersant, a solution in which the upper limit of p, q, or r is 400 or higher, or in which the total of p+q+r is at least 1000, can be used either singly or as a mixture. If foaming of the paste poses a problem, then an ordinary anti-foaming agent, such as a silicon-based agent, can also be used together.

The present invention can also be used favorably in applications in which usual aqueous PTFE dispersions are used. For example, the present invention can be used as a water-based paint to coat an aluminum/SUS sheet used for rice cookers, frying pans, and other such cooking utensils, or can be used to cover a substrate of heat-resistant woven fabric made of glass fiber, carbon fiber, or the like, and used in conveyor belts, film structural materials (tent films), high-frequency printed substrates, ground packing, bag filters, and the like.

The present invention can be furthermore applied to various applications, examples of which include capacitor inductors, and so forth, in which a cast film obtained by coating and baking a metal sheet is used as an electrical insulation material; applications in which viscose or the like is added, wherein the mixture is spun at high pressure into a solidification liquid to form fibers, and these are baked and drawn for use as PTFE fibers (emulsion spinning); sliding materials (oil-less bearing materials) obtained by coating the surface of a porous steel sheet with a mixed paste containing a filler such as lead, and then baking; agents to prevent dripping during combustion by adding the present invention to a polycarbonate (PC), a PC/ABS alloy, or another such plastic powder; and dust inhibitors which prevent dust from leaving by adding the present invention to a powder of a chemical fertilizer, lime, or another such soil improver, or of cement or another such construction material.

With an FEP or other such melt resin aqueous dispersion, possible applications include the coating of papermaking drying roll cylinders or synthetic resin or rubber molds for epoxy resins, urethane foams, hard urethane rubbers, or the like, thus utilizing the non-tackiness of the dispersion; the corrosion-resistant coating of reaction kettles, ducts, piping, valves, pumps, and so forth, thus utilizing the chemical resistance of the dispersion; adhesives for the film structural materials (tent films) mentioned above; and cast films used for electrical insulation.

The present invention is an electrode additive comprising a fluoropolymer dispersion having properties whereby the surfactant used for stabilizing the aqueous dispersion of the fluoropolymer decomposes, evaporates, or sublimates at a temperature near the boiling point of water, and therefore residual surfactant can be kept to a minimum in a cell or capacitor electrode coating film, allowing the production of an electrode with better characteristics. Furthermore, although up to now drying at close to 300° C. was necessary in order to adequately remove the surfactant in applications in which residual surfactant was a concern even though the fluoropolymer was in the form of an aqueous dispersion, with the present invention the drying temperature and time can be set over a wider range, up to a temperature closer to the boiling point of water.

BEST MODE FOR CARRYING OUT THE INVENTION

Examples of the present invention will be described as follows.

REFERENCE EXAMPLES 1 TO 11

Preparation of Fluoropolymer Dispersion

Fluoropolymers were subjected to emulsion polymerization in a 6L stainless steel autoclave by a conventional method, which yielded fluoropolymer dispersions having the melting points and solids concentrations shown in Table 1.

TABLE 1

| Ref. Ex. | Fluoropolymer (mol % below) | Polymer melting point | Solids concentration (wt %) |
|---|---|---|---|
| 1 | PTFE | 327 | 30 |
| 2 | HFP-modified PTFE | 325 | 30 |
| 3 | PPVE-modified PTFE | 325 | 30 |
| 4 | PMVE-modified PTFE | 325 | 30 |
| 5 | TFE/HFP = 91/9% | 245 | 30 |
| 6 | PVdF | 175 | 30 |
| 7 | P(VdF-TFE) 90/10% | 138 | 30 |
| 8 | P(VdF-TFE-HFP) 65/33/2% | 135 | 30 |
| 9 | P(VdF-TFE-PPVE) 54/40/6% | 125 | 30 |
| 10 | P(VdF-TFE-PMVE) 57/36/7% | 140 | 30 |
| 11 | P(VdF-TFE-HFP) elastomer 65/15/20% | — | 30 |

MANUFACTURING EXAMPLE 1

Preparation of Fluoropolymer Dispersion Stabilized with Surfactant

Examples of suitable methods for concentrating the fluoropolymer dispersions in the reference examples include a phase separation method, in which the surfactant of the present invention is added to the polymerized dispersion to effect primary stabilization, after which the product is left at a constant temperature exceeding the cloud point of the surfactant for a whole day, which yields a concentrated dispersion; a membrane separation method; an electrical concentration method; and other commonly known methods. The solids were thus concentrated to about 40 to 65 wt %, after which more of the surfactant of the present invention was added as a final step in order to maintain dispersion stability during storage or shipping, and various adjustments (stability, liquid viscosity, etc.) were made so as to make the product easier to handle, which finally yielded a fluoropolymer dispersion.

EXAMPLES 1 TO 6 AND COMPARATIVE EXAMPLE 1

Measurement of the Properties of a Button Cell Produced Using the Dispersion as an Electrode Binder Cell electrodes were produced using the fluoropolymer dispersions shown in Table 2 as a binder. Cells were produced as follows.

Lithium cobaltate (92 weight parts), manmade graphite (2 weight parts), and acetylene black (1 weight part) were added to a 2% carboxymethyl cellulose aqueous solution (40 weight parts) to produce a uniform slurry, after which a fluoropolymer dispersion whose solids concentration had been adjusted to 30 wt % was added in an amount of 5 weight parts (as solids) to make a positive electrode paste.

The surface of an aluminum foil was coated with this positive electrode paste by a doctor blade method, and the coating was dried under the temperature and time conditions shown in Table 2 to remove the water and produce a positive electrode.

For the negative electrode, an NMP (N-methyl-2-pyrrolidone) solution of polyvinylidene fluoride whose solids concentration had been adjusted to 6 wt % was added in an amount of 5 weight parts (as solids) to graphite (95 weight parts) to produce a negative electrode paste.

The surface of a copper foil was coated with this negative electrode paste by a doctor blade method, and the coating was dried in a vacuum at 150° C. for 4 hours to remove the solvent and produce a negative electrode.

2016 button cell parts were prepared, and positive and negative electrode plates punched out in a diameter equal to the inside diameter of the button cell were prepared along with a fine porous membrane made of polypropylene as a separator.

The electrolytic solution comprised 1 mol·dm$^{-3}$ LiPF$_8$ as the electrolyte and a mixed solvent of EC (ethylene carbonate) and EMC (ethylmethyl carbonate) with a 1:2 volumetric ratio.

2016 button cells were produced using the above parts.

The cells thus produced were set to a current value such that the current density would be 0.5 mA·cm$^{-2}$ with respect to the internal geometric surface area, and charging and discharging were performed at a cell voltage between 4.2 V and 3 V. The initial capacity here was the capacity at the fifth cycle, and this was compared with the capacity after 50 cycles to evaluate the performance of the cells in terms of how well the capacity was maintained, with 90% or higher being termed good, and less than 90% poor.

Cell Measurement Results:

The electrode coating films exhibited good adhesion in all of the cells in the examples and comparative example, but when it came to cell characteristics, substantially no problems were encountered with Examples 1 to 6, whereas in Comparative Example 1 the discharge capacity after 50 cycles was less than 90% of the initial value, which was inferior to the results in the examples of the present invention. These results are given in Table 2.

TABLE 2

| | Polymer | Surfactant | Surfactant concentration wt % versus polymer | Drying temperature ° C. | Drying time min. | Adhesion | Cell characteristics discharge capacity after 50 cycles |
|---|---|---|---|---|---|---|---|
| Example 1 | PTFE | Plonon 104 | 10 | 180 | 60 | good | good |
| Example 2 | PTFE | Plonon 204 | 10 | 180 | 60 | good | good |
| Example 3 | PTFE | Plonon 208 | 10 | 180 | 60 | good | good |
| Example 4 | PTFE | Unisafe A-LE | 10 | 180 | 60 | good | good |

TABLE 2-continued

| | Polymer | Surfactant | Surfactant concentration wt % versus polymer | Drying temperature °C. | Drying time min. | Adhesion | Cell characteristics discharge capacity after 50 cycles |
|---|---|---|---|---|---|---|---|
| Example 5 | PTFE | DS101 | 10 | 180 | 60 | good | good |
| Example 6 | HFP-modified PTFE | Plonon 104 | 10 | 180 | 60 | good | good |
| Comparative Example 1 | PTFE | TX-100 | 10 | 180 | 60 | good | poor |

The difference in the results in Table 2 is believed to be attributable to the difference in the proportion of residual surfactant. Unfortunately, it is not easy to measure the amount of residual surfactant in the obtained electrodes. In view of this, using fluoropolymer dispersions containing surfactants in the same concentration as in Table 2, simple polymer films were produced under the same drying conditions as in Table 2, and the residual surfactant contents were investigated. These results are given in Table 3.

With the fluoropolymer dispersions obtained using a surfactant containing no phenyl groups (Examples 1 to 6), the residual surfactant content in the film after drying was 22 wt % or less in every case, whereas the residual surfactant content was 80% with the fluoropolymer dispersion obtained using TX-100, which contains phenyl groups (Comparative Example 1).

Further, for the fluoropolymer dispersion in Example 1, the residual surfactant content when other surfactants were used concurrently was measured, the results of which are given in Table 4.

TABLE 3

| | Surfactant | Surfactant concentration wt % versus polymer | Drying temperature °C. | Drying time min. | Residual surfactant wt % vs. initial amount |
|---|---|---|---|---|---|
| Polymer dispersion of Example 1 | Plonon 104 | 10 | 180 | 60 | 16 |
| Polymer dispersion of Example 2 | Plonon 204 | 10 | 180 | 60 | 18 |
| Polymer dispersion of Example 3 | Plonon 208 | 10 | 180 | 60 | 20 |
| Polymer dispersion of Example 4 | Unisafe A-LE | 10 | 180 | 60 | 22 |
| Polymer dispersion of Example 5 | DS101 | 10 | 180 | 60 | 21 |
| Polymer dispersion of Example 6 | Plonon 104 | 10 | 180 | 60 | 16 |
| Polymer dispersion of Comparative Example 1 | TX-100 | 10 | 180 | 60 | 80 |

TABLE 4

| Surfactant 1 | Surfactant 1 concentration wt % vs. polymer | Surfactant 2 | Surfactant 2 concentration wt % versus polymer | Drying temperature ° C. | Drying time min. | Residual surfactant wt % vs. initial amount |
|---|---|---|---|---|---|---|
| TX-100 | 1 | Plonon 104 | 9 | 180 | 60 | 20 |
| TX-100 | 5 | Plonon 104 | 5 | 180 | 60 | 50 |
| TX-100 | 4 | Plonon 204 | 6 | 180 | 60 | 41 |
| TX-100 | 3 | Plonon 208 | 7 | 180 | 60 | 36 |
| TX-100 | 2 | Unisafe A-LE | 8 | 180 | 60 | 29 |
| TX-100 | 2 | DS101 | 8 | 180 | 60 | 28 |
| Dispanol TOC | 2 | Plonon 104 | 8 | 180 | 60 | 18 |

Total surfactant concentration (wt % vs. polymer): 10%

As seen above, in the present invention the amount of residual surfactant can be reduced even when a surfactant that does not tend to remain in an electrode coating film is used together with another surfactant.

EXAMPLES 7 TO 13 AND COMPARATIVE EXAMPLE 2

Measurement of Properties of Button Cells Produced Using Two Types of Dispersion as an Electrode Binder Other than using the fluoropolymer dispersions shown in Table 5 as binders, everything was conducted in the same manner as in Example 1, and the cell properties were evaluated. These results are given in Table 5.

The residual surfactant content was also measured just as in Example 1, the results of which are given in Table 6.

TABLE 5

| | Polymer A | Polymer B | Blend ratio weight ratio | Surfactant | Drying temperature ° C. | Drying time min. | Adhesion | Cell characteristics Discharge capacity after 50 cycles |
|---|---|---|---|---|---|---|---|---|
| Example 7 | PTFE | FEP | 50/50 | Plonon 208 | 250 | 60 | good | good |
| Example 8 | PTFE | PVdF | 50/50 | DS101 | 200 | 60 | good | good |
| Example 9 | HFP-modified PTFE | P(VdF-TFE-HFP) 65/33/2% | 60/40 | Plonon 104 | 180 | 60 | good | good |
| Example 10 | PPVE-modified PTFE | P(VdF-TFE-PPVE) 54/40/6% | 60/40 | Plonon 204 | 180 | 60 | good | good |
| Example 11 | PMVE-modified PTFE | P(VdF-TFE-PMVE) 57/36/7% | 60/40 | Unisafe A-LE | 180 | 60 | good | good |
| Example 12 | PTFE | P(VdF-TFE) 90/10% | 50/50 | Plonon 104 | 160 | 60 | good | good |
| Example 13 | HFP-modified PTFE | P(VdF-TFE-HFP) elastomer 65/15/20% | 70/30 | Plonon 104 | 120 | 60 | good | good |
| Comparative Example 2 | PTFE | P(VdF-TFE) 90/10% | 50/50 | TX-100 | 160 | 60 | good | poor |

Surfactant concentration (wt % vs. polymer): 10%

TABLE 6

| | Surfactant | Drying temperature ° C. | Drying time min. | Residual surfactant wt % vs. initial amount |
|---|---|---|---|---|
| Blended dispersion of Example 7 | Plonon 208 | 250 | 60 | 8 |
| Blended dispersion of Example 8 | DS101 | 200 | 60 | 15 |
| Blended dispersion of Example 9 | Plonon 104 | 180 | 60 | 12 |

TABLE 6-continued

| Surfactant | | Drying temperature °C. | Drying time min. | Residual surfactant wt % vs. initial amount |
|---|---|---|---|---|
| Blended dispersion of Example 10 | Plonon 204 | 180 | 60 | 16 |
| Blended dispersion of Example 11 | Unisafe A-LE | 180 | 60 | 17 |
| Blended dispersion of Example 12 | Plonon 104 | 160 | 60 | 20 |
| Blended dispersion of Example 13 | Plonon 104 | 120 | 60 | 25 |
| Blended dispersion of Comparative Example 2 | TX-100 | 160 | 60 | 82 |

Surfactant concentration (wt % vs. polymer): 10%

As seen in Table 5, with Examples 7 to 13, measurements were made of the cell properties of button cells that were obtained using various types of fluoropolymer dispersion containing surfactants having no phenyl groups as a positive electrode binder, which revealed that the discharge capacity after 50 cycles remained at 90% or higher (good) in every case. By contrast, with the button cell obtained using the dispersion of Comparative Example 2 containing TX-100 surfactant (which has a phenyl group), the discharge capacity was only 86%, or less than 90% (poor).

Also, as shown in Table 6, with the fluoropolymer dispersions obtained using surfactants containing no phenyl groups (Examples 7 to 13), the residual content in the film after drying was 25% or less in every case, whereas it was 82% in Comparative Example 2, which contained TX-100 having phenyl groups.

EXAMPLE 14

Electrode Paste Production and Electrode Coating

Cell electrodes were produced using the fluoropolymer dispersions of Examples 1 to 3 (Table 2) and Example 3 (Table 5) as a binder. Cells were produced as follows.

Lithium cobaltate (92 weight parts), manmade graphite (2 weight parts), and acetylene black (1 weight part) were added to a 25 wt % aqueous solution of polyoxyethylene polyoxypropylene block polymer (composition: polypropylene glycol with a molecular weight of 3000, 20% ethylene glycol component) (40 weight parts) to produce a uniform slurry, after which a fluoropolymer dispersion whose solids concentration had been adjusted to 50 wt % was added in an amount of 5 weight parts (as solids) to make a positive electrode paste. The surface of an aluminum foil was coated with this positive electrode paste by a doctor blade method, and the coating was dried at 250° C. for 2 hours to remove the water and produce a positive electrode.

The invention claimed is:

1. An electrode additive comprising an aqueous fluoropolymer dispersion, wherein the aqueous fluoropolymer dispersion is stabilized by the use of a nonionic surfactant expressed by general formula 1 in an amount of 3 to 20 wt % with respect to the polymer solids:

$$H-O-(CH_2CH_2O)_q-(A1)_p-(CH_2CH_2O)_r-H \quad (1)$$

(wherein A1 is $-CH(CH_3)CH_2O-$ or $-CH(CH_3)-CH_2CH_2O-$;
p is an integer from 0 to 400, q is an integer from 1 to 400, r is an integer from 0 to 400;
$5 \leq p+q+r \leq 1000$, $1 \leq (q+r)/p \leq 800$ (when p is not 0);
when p=0, r=0, and
when $1 \leq p \leq 400$, $0 \leq r \leq 400$).

2. An electrode additive comprising an aqueous fluoropolymer dispersion, wherein the aqueous fluoropolymer dispersion is stabilized by the use of an anionic surfactant containing a perfluoroalkyl group or a perchlorofluoroalkyl group.

3. An electrode additive comprising an aqueous fluoropolymer dispersion, wherein the aqueous fluoropolymer dispersion is stabilized by the use of an amphoteric surfactant comprising amine oxides.

4. The electrode additive according to claim 1, wherein the fluoropolymer is a blend of at least two types of fluoropolymers.

5. The electrode additive according to claim 1, wherein the electrode is a cell electrode or a capacitor electrode.

6. The electrode additive according to claim 1, used as a binder or a water repellant.

7. An electrode containing the electrode additive according to claim 1.

8. A method for manufacturing an electrode by making a paste from an electrode constituent material comprising a mixture of an electrode active material, an electroconductive agent, and a binder, and coating a collector with the paste, wherein the collector is coated with the electrode constituent material paste obtained by dispersing the electrode constituent material in a dispersant composed of an aqueous solution of 0.5 to 30 wt % of the surfactant expressed by general formula 1:

$$R1-O-(CH_2CH_2O)_q-(A1)_p-(CH_2CH_2O)_r-R2 \quad (1)$$

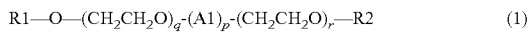

(wherein A1 is $-CH(CH_3)CH_2O-$ or $-CH(CH_3)-CH_2CH_2O-$;
R1 and R2 are each a hydrogen atom, a $C_1$ to $C_7$ alkyl group, or a $C_3$ to $C_7$ alkenyl group;
p is an integer from 0 to 400, q is an integer from 1 to 400, r is an integer from 0 to 400;
$5 \leq p+q+r \leq 1000$, $1 \leq (q+r)/p \leq 800$ (when p is not 0);
when p=0, r=0, and
when $1 \leq p \leq 400$, $0 \leq r \leq 400$).

9. An aqueous dispersion composition containing a fluoropolymer and a nonionic surfactant expressed by general formula 1 in an amount of 3 to 20 wt % with respect to the polymer solids:

$$H-O-(CH_2CH_2O)_q-(A1)_p-(CH_2CH_2O)_r-H \quad (1)$$

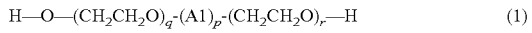

(wherein A1 is $-CH(CH_3)CH_2O-$ or $-CH(CH_3)-CH_2CH_2O-$;
p is an integer from 0 to 400, q is an integer from 1 to 400, r is an integer from 0 to 400,
$5 \leq p+q+r \leq 1000$, $1 \leq (q+r)/p \leq 800$ (when p is not 0);
when p=0, r=0, and
when $1 \leq p \leq 400$, $0 \leq r \leq 400$).

10. The composition according to claim 9, wherein the nonionic surfactant is a polyoxyethylene polyoxypropylene block polymer.

11. The electrode additive according to claim 2, wherein the fluoropolymer is a blend of at least two types of fluoropolymers.

12. The electrode additive according to claim 2, wherein the electrode is a cell electrode or a capacitor electrode.

13. The electrode additive according to claim 2, used as a binder or a water repellant.

14. An electrode containing the electrode additive according to claim 2.

15. The electrode additive according to claim 3, wherein the fluoropolymer is a blend of at least two types of fluoropolymers.

16. The electrode additive according to claim 3, wherein the electrode is a cell electrode or a capacitor electrode.

17. The electrode additive according to claim 3, used as a binder or a water repellant.

18. An electrode containing the electrode additive according to claim 3.

* * * * *